E. D. TIPPETT.
Meat Cutter.
No. 4,909. Patented Dec. 28, 1846.
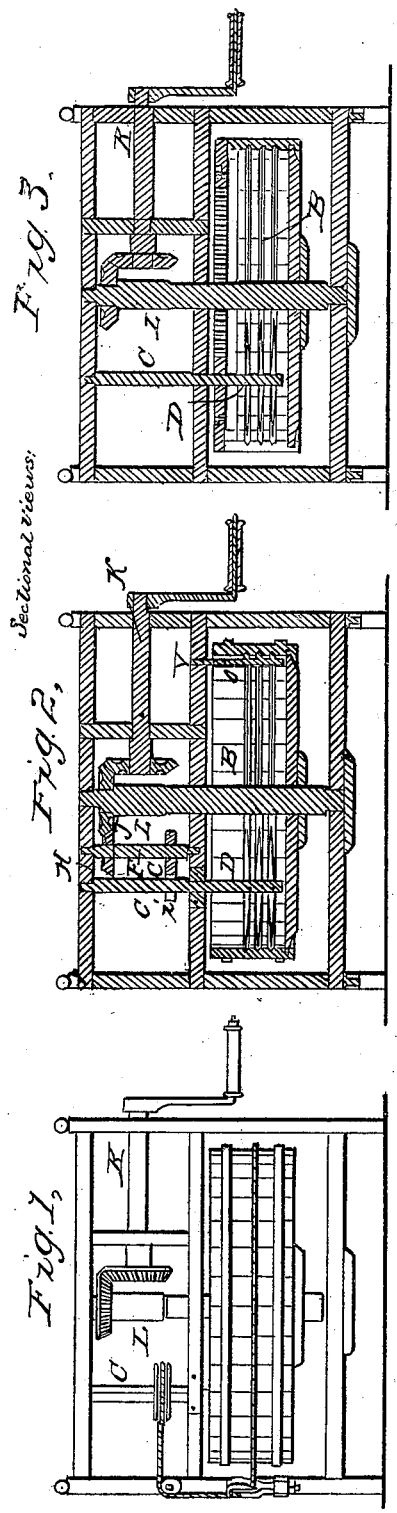
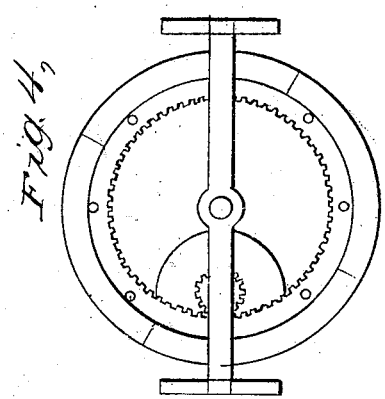
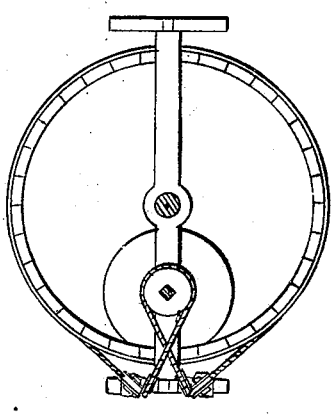

UNITED STATES PATENT OFFICE.

EDWD. D. TIPPETT, OF GEORGETOWN, DISTRICT OF COLUMBIA.

MEAT-CUTTER.

Specification of Letters Patent No. 4,909, dated December 28, 1846.

*To all whom it may concern:*

Be it known that I, EDWARD D. TIPPETT, of Georgetown, in the District of Columbia, have invented a new and Improved Mode of Cutting Sausage-Meat Different from Any Now in Use; and I do hereby declare that the following is a full and exact description of the machine.

The nature of my invention consists in cutting the sausage meat by rotary motion or by circular knives revolving in a tub with great velocity and running in grooves in the tub; the tub also revolving by crank motion, giving the meat a centrifugal force to the circular knives. The tub runs horizontally and the grooves for the edge of the circular knives to run in are made in the side of the tub. The knives are not permitted to touch the wood in any place, but to keep the regular course of the grooves. The tub and knives revolve the same way so that the meat by the centrifugal force of the tub is brought directly under the knives. The circular knives revolve much faster than the tub, so that the meat is cut perfectly through as it is brought before the knives in their grooves by a quick motion. The knives are revolved by a band around the tub or by cog wheels from the main shaft or axis of the tub. Cog wheels are more substantial, but the band is much cheaper while it is subject to get out of order. Either plan may be used to revolve the knives as called for; the discovery or improvement does not consist in the mode of giving action, but in the combination of known mechanical arrangements.

To enable others skilled in the mechanical arts to make and use my invention, I will proceed to describe its construction and draft it in mathematical form so that the parts I claim as my invention may be properly designated.

The following diagram represents the circular knives propelled by a band around the tub; the knives are not seen on the axis of the cutters in this Figure 1, as seen in Fig. 2.

A is the frame constituted of five pieces of timber mortised together, as seen at A.

B is the meat-tub, which in Fig. 1 is represented with staves in full so that the knives on axis C cannot be seen; but in Fig. 2 the knives are represented on the end of axis in the tub, at D; the edges of which are in the grooves, as seen at E.

L is the main shaft or axis upon which the meat tub revolves.

F is an axis for two cog wheels G H. G is geared into a pinion on the axis of the cutters, as seen at I. J is a spur-wheel connected to the pinion H, which constitutes a system of double gearing to arrive at speed or velocity for the circular knives and also to make or give the knives the same motion with the tub J E; they must both revolve the same way.

The meat is placed in the tub, cut up in small pieces or in a proper manner, and by turning the crank axis K the whole is put into motion. The circular knives D will run with great velocity, while the meat will be cut perfectly through at every time it is brought around. A kind of plow is introduced on the opposite side to mix or stir the meat constantly, as represented at O. It is bolted on to the cross timber at V. The plow referred to is made of any suitable material. It may consist of a simple piece of timber with three small shovel plows set into it, which run into the meat near the inside of the tub to give it a contrary motion to the centrifugal motion produced by the revolution of the tub, for the purpose of keeping the meat in various and continuous motions.

Fig. 4 represents a top view of the tub and pinion, the side of which is seen in Fig. 3.

Having thus described the combination and arrangement of the several parts composing my meat cutting machine, what I claim therein as new and desire to secure by Letters Patent is—

The combination of the grooved tub with the revolving knife as herein described, with the combined relative motion of the tub and knives as herein set forth, whereby the meat is kept continually in motion and thereby presented to the knives in various and changing positions.

EDWARD D. TIPPETT.

Witnesses present:
PEIRRE JAVIRS,
T. L. SMITH.